L. J. PHELPS.
IRREVERSIBLE STEERING GEAR.
APPLICATION FILED DEC. 13, 1917.
1,328,761.
Patented Jan. 20, 1920.
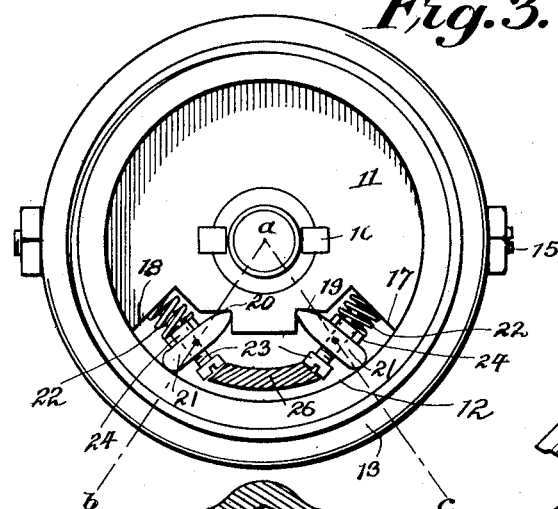
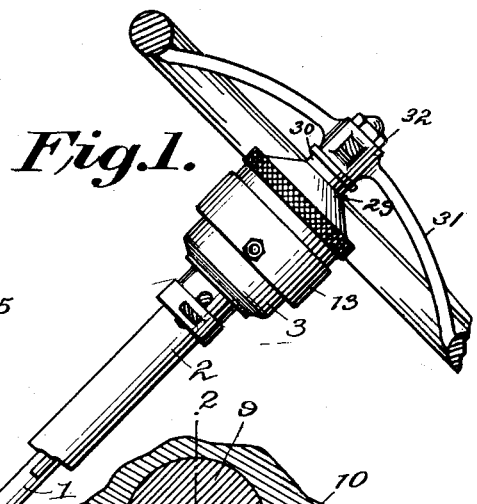
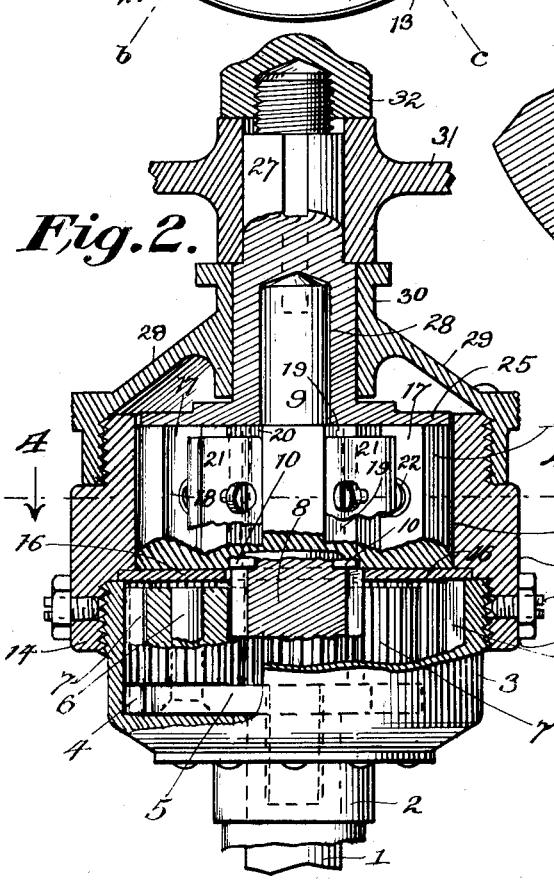
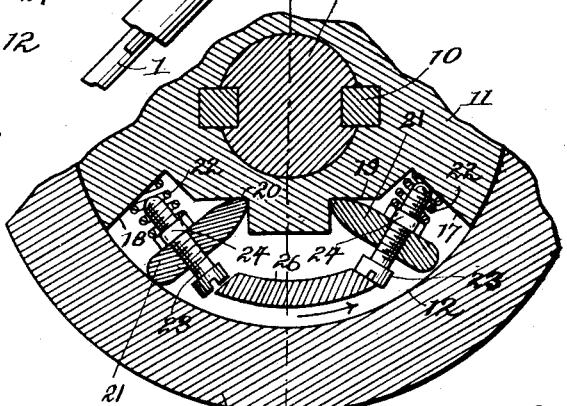
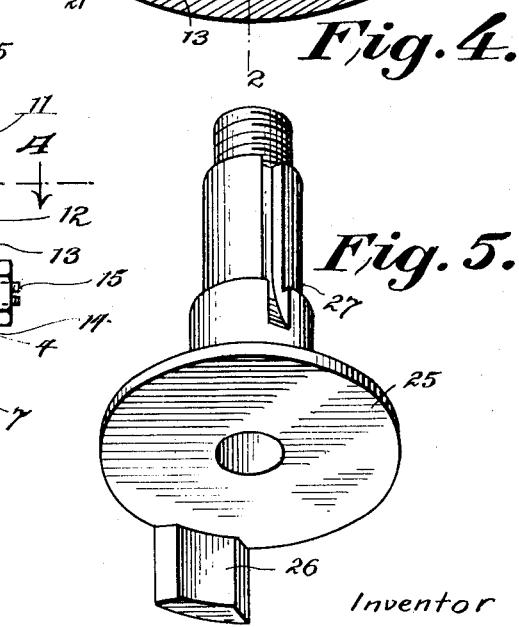
Witnesses
Horace N. Lybrand
Inventor
Lucius J. Phelps
By Dodge and Sons,
Attorneys

UNITED STATES PATENT OFFICE.

LUCIUS J. PHELPS, OF SAN DIEGO, CALIFORNIA.

IRREVERSIBLE STEERING-GEAR.

1,328,761.   Specification of Letters Patent.   Patented Jan. 20, 1920.

Application filed December 13, 1917. Serial No. 206,952.

*To all whom it may concern:*

Be it known that I, LUCIUS J. PHELPS, a citizen of the United States, residing at San Diego, in the county of San Diego and State of California, have invented a certain new and useful Improvement in Irreversible Steering-Gears, of which the following is a specification.

This invention pertains to an irreversible steering-gear, adapted more especially for application to motor cars or vehicles.

Such devices have heretofore been produced and utilized and in Letters Patent No. 1,187,860, granted to me under date of June 20, 1916, several embodiments of such structures are set forth and claimed. The present invention, in a sense, is an improvement upon such devices, in that it provides a somewhat simpler construction, and one which affords an extended bearing surface between the coating friction elements of the lock. As under my patented constructions, the present device affords a lock for the steering gear, which will keep the car from drifting and will hold the wheels against deflection under impact with an obstruction, or when passing over a rut, while at the same time allowing the operator to manipulate the steering wheel with ease and facility.

The new form is shown in connection with the usual gear steering mechanism of a Ford car, though it is to be understood that it may be applied to any other steering gear where an irreversible clutch or brake is found desirable to hold the parts in a predetermined or desired position until manually shifted.

In the drawings:

Figure 1 is a sectional elevation of a steering post and wheel to which the irreversible clutch is applied;

Fig. 2 a vertical sectional view, on the line 2—2 of Fig. 4;

Fig. 3 a top plan view of the friction or brake drum, the inclosed coacting friction or brake member, and the actuating elements therefor;

Fig. 4 a horizontal sectional view on the line 4—4 of Fig. 2, the parts being shown on an enlarged scale and with the clutch or brake release element also shown; and Fig. 5 a perspective view of the release device which is secured to and actuated by the steering wheel.

The usual steering or driven shaft or post is denoted by 1 and extends upwardly within a fixed tubular casing 2. At the upper end of the tubular member 2 and rigidly affixed thereto is a casing 3, having a circular rack or gear 4 formed upon its inner face. A plate 5 is rigidly secured to the upper end of the steering post and forms the support for stub shafts or axles 6, upon which pinions 7 are mounted, the pinions meshing with the internal circular rack or gear 4. Said pinions 7 also mesh with a centrally-disposed steering gear drive pinion 8 secured to or formed upon a shaft 9, to which in turn, above the pinion, is rigidly affixed, by keys 10, a disk-shaped brake-shoe or clutch element 11. Said friction element or brake-shoe is of the form best shown in Fig. 3, and its peripheral surface bears against the inner wall 12 of a drum or casing 13. Said drum is provided with a depending skirt or flange 14 which is internally threaded and is screwed upon the upper externally-threaded portion of the fixed casing 3, being held in rigid relation therewith by set screws 15. A washer 16, Fig. 2, is placed below said shoe, loosely encircling the central pinion 8, overlying pinions 7 and entering at its periphery into an undercut groove formed in the wall of the casing 13.

The brake shoe or movable clutch member 11, see Figs. 3 and 4, is cut away at one side so as to provide two faces or abutments 17 and 18, and two spaced seats or angular recesses 19, 20. The periphery of the shoe is normally held against the inner face 12 of the shell or casing 13 (which constitutes the fixed braking element) by two wedge blocks 21, 21. The blocks are alike in form, the inner end of each being beveled and bearing, respectively, in the seat formed at the bottom of the adjacent angular recess 19 or 20. The outer end or face of each block is rounded or curved and bears against the brake face 12. Said blocks, as will be noted upon reference to Figs. 3 and 4, stand at an angle to radial lines (as *a—b, a—c*, Fig. 3) drawn through the coincident axes of the two braking elements and the center of each block; or, in other words, the blocks are too long to assume a true radial position with reference to the coincident axes of the two braking elements 11 and 12. A spring 22 is interposed between each block and the adjacent abutment 17 or 18, and a screw 23 is threaded in the block, the inner end of the screw passing into the convolutions of the coil and being held in its adjusted position by a lock nut 24. The springs, as will be readily appreciated, act to force the rounded ends of the blocks outwardly against the face 12, the blocks rocking about their inner beveled ends, bearing in the angular seats provided therefor. The action is such as to force the brake shoe or moving braking element into close and intimate contact with the fixed braking element and to hold the parts in such relation until one or the other of the blocks is freed from binding contact with the face 12.

Inasmuch as pinion 8 is fast to the brake shoe 11, it will be seen that the pinions 7 will be locked against movement between said pinion 8 and the fixed internal gear or circular rack 4, and as a consequence the steering-post 1, through axles 6 and plate 5, will likewise be held against rotative movement.

To provide releasing means for the clutch or brake which comes into action upon manipulation of the steering wheel I employ the device shown in Fig. 5, and which is directly connected to the steering wheel. It may be said to comprise a disk or plate 25, having a downwardly-extending sector-shaped lug or actuator 26, of such width from edge to edge as to almost, but not quite, contact with the heads of both of the screws 23. A post or stem 27 extends upwardly from the center of the disk, and a socket 28 is provided in the disk and lower portion of the stem, which socket is adapted to receive the upper end of shaft 9.

As indicated in Fig. 2 a slight clearance is provided between the shaft 9 and the element in which it is mounted, such clearance in practice being .005 of an inch.

A cap piece 29, provided with a centrally-disposed hub or bearing 30 for the post 27 is secured to the upper portion of the casing 13, and keyed to the post is the steering-wheel 31. A nut 32 is screwed upon the upper end of the post, and bears upon the steering-wheel hub.

As will be readily appreciated, the slightest turn of the steering-wheel will impart a similar movement to disk 25 and the lug or actuator 26 and, as a consequence, one or the other wedge block (say that to the right in Fig. 4, in which instance the steering-wheel is supposed to be moved counter-clockwise under the guidance of the operator) will be rocked, putting its spring under compression and carrying its rounded end slightly away from the fixed braking surface 12. When the parts are in this position, the brake sleeve or element 11 is free to rotate counter-clockwise, the other wedge block dragging along the brake surface and tending, by reason of its angular relation, to swing rearwardly out of wedging position. Thus it will be seen that the brake is instantly released, and this without any effort upon the part of the operator of the car other than that exerted in the usual manipulation of the steering-wheel. Immediately the pull or strain on the steering-wheel is released, the actuator 26 moves back to a slight extent, permitting the compressed spring to throw the wedge block against which it is bearing outwardly into wedging position and, as a consequence, the brake-shoe or movable braking element will be wedged into locking frictional contact with the fixed brake face 12.

By the employment of the cylindrical shell or casing 13 with a fixed braking surface upon its inner face, and the coöperating shoe 11, I produce an extended braking area, so that the strain is not localized, but on the other hand is extended to a considerable degree.

The structure as above set forth may be readily applied to the "Ford" automobile, without alteration thereof, and while especially designed for such application it is to be understood that it may be employed in conjunction with any steering mechanism in which a locking clutch or brake is desired.

Having thus described my invention, what I claim is:

1. In combination with a driven shaft; a brake-drum having an interiorly-disposed braking surface; a non-expanding, laterally shiftable, brake-shoe housed within and coöperating therewith; means for normally forcing the brake-shoe into locking relation with the drum; a driving shaft; and means carried by said shaft to release said means and to actuate the driven shaft.

2. In combination with a steering shaft; a fixed rack; a plurality of pinions attached to the shaft and meshing with the rack; a fixed member having an annular braking surface; a brake-shoe having an exterior braking surface adapted to contact and coöperate with the annular surface aforesaid; a pinion secured to said brake-shoe and meshing with the aforementioned pinions; a pair of swinging wedge blocks interposed between the fixed braking surface and the shoe; a spring for each block acting to force the block into engagement with the fixed braking surface; an actuator extending inwardly between said blocks and adapted to rock one or the other thereof; and a steering-wheel connected to said actuator.

3. In combination with a steering or driven shaft, a fixed brake-drum having an interiorly-disposed, annular braking surface; a brake-shoe housed within said drum and presenting a braking surface substantially coextensive with that of the fixed surface; connections between said brake-shoe and the driven shaft; a pair of swinging wedge-blocks fulcrumed upon the brake-shoe at their inner ends, the outer ends of said blocks normally contacting with the braking surface of the fixed drum; a spring interposed between each block and the brake-shoe, said springs serving to normally rock the wedge blocks and to force the outer ends thereof into contact with the annular braking surface of the fixed drum; an actuator extending inwardly between said blocks; and a steering-wheel connected to said actuator, whereby one or the other of said wedge-blocks may be moved out of contact with the fixed braking surface, thereby releasing the braking action between the parts and permitting rotation of the driven shaft through movement of the steering-wheel.

4. In combination with a driven or steering shaft, a fixed annular rack located adjacent the upper end thereof; a plurality of pinions secured to and movable with the shaft, said pinions meshing with the rack; a fixed brake drum located above the rack and presenting an interiorly-disposed annular braking surface; a brake-shoe housed within said drum and presenting a braking surface coextensive with the major portion of the annular braking surface; a pair of wedge-blocks interposed between the annular braking surface and a cut-away portion of the brake-shoe and having a rocking bearing at their inner ends upon the brake-shoe; a spring interposed between each of said blocks and the adjacent face of the brake-shoe and serving normally to throw the outer ends of said blocks into contact with the fixed annular braking surface; a screw mounted in each block, said screws extending outwardly therefrom and toward each other; an actuating element extending inwardly between said screws; and a steering wheel connected to said actuating element, whereby when the wheel is turned in one or the other direction the actuating element will, through contact with one or the other of the screws aforesaid, rock the corresponding wedge block and throw it out of contact with the annular fixed braking surface, so that the brake-shoe will be relieved from pressure against the fixed braking surface, thereby permitting rotation of the driven shaft through the gearing aforesaid.

5. In combination with a driven shaft; a driving shaft; and clutch or brake mechanism interposed and forming a connection between the same to prevent movement of the driven shaft except at such time as it is actuated by the driving shaft, said mechanism comprising a fixed member having an internal annular braking surface, a brake-shoe rotatably mounted therein and movable with the driven shaft, said shoe having a bearing face substantially coextensive of the internal braking surface, a pair of wedge-blocks having a rocking bearing on the shoe and bearing at their outer ends on the annular braking surface, a spring for each block acting to hold the same in wedging relation to the shoe and the annular braking surface, and an arm or lug integral with the driving shaft and extending in between said blocks.

6. In combination with a driven shaft, a brake drum having an interiorly-disposed braking surface; a non-expanding, laterally shiftable brake-shoe housed within and coöperating therewith; gearing interposed between said brake-shoe and driven shaft; means for normally forcing the brake-shoe into locking relation with the drum; a driving shaft; and means carried by said shaft to release said means and to actuate the driven shaft through the gearing aforesaid.

In testimony whereof I have signed my name to this specification.

LUCIUS J. PHELPS.